United States Patent
Efstathopoulos

(10) Patent No.: US 10,015,173 B1
(45) Date of Patent: Jul. 3, 2018

(54) SYSTEMS AND METHODS FOR LOCATION-AWARE ACCESS TO CLOUD DATA STORES

(71) Applicant: Symantec Corporation, Mountain View, CA (US)

(72) Inventor: Petros Efstathopoulos, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 262 days.

(21) Appl. No.: 14/642,794

(22) Filed: Mar. 10, 2015

(51) Int. Cl.
*H04L 29/06* (2006.01)

(52) U.S. Cl.
CPC .......... *H04L 63/107* (2013.01); *H04L 63/062* (2013.01); *H04L 63/0823* (2013.01)

(58) Field of Classification Search
CPC ... H04L 63/107; H04L 63/062; H04L 63/082; H04L 63/0823
See application file for complete search history.

(56) References Cited

U.S. PATENT DOCUMENTS

| | | | | |
|---|---|---|---|---|
| 7,729,995 B1* | 6/2010 | Alain | .................. | G06F 21/6209 705/64 |
| 8,312,064 B1* | 11/2012 | Gauvin | ............... | G06F 21/6218 707/822 |
| 2006/0015945 A1* | 1/2006 | Fields | .................. | G06F 21/606 726/27 |
| 2012/0317414 A1* | 12/2012 | Glover | ................. | G06Q 10/101 713/165 |
| 2013/0110985 A1* | 5/2013 | Shekher | ............. | H04L 67/1097 709/219 |
| 2013/0151663 A1* | 6/2013 | He | ...................... | H04L 67/1097 709/217 |
| 2013/0275470 A1* | 10/2013 | Cao | ........................ | G06F 9/5072 707/781 |
| 2015/0310188 A1* | 10/2015 | Ford | ....................... | G06F 21/10 726/28 |
| 2015/0341359 A1* | 11/2015 | Yang | ...................... | H04L 63/10 726/1 |
| 2016/0028699 A1* | 1/2016 | Ambroz | ............. | H04L 63/0428 713/168 |
| 2016/0241995 A1* | 8/2016 | Eda | ....................... | H04W 4/021 |

OTHER PUBLICATIONS

Meier, Realizing and Implementing Location-based Access Control Policies, 2013.*

(Continued)

*Primary Examiner* — Hadi S Armouche
*Assistant Examiner* — Huan V Doan
(74) *Attorney, Agent, or Firm* — FisherBroyles, LLP

(57) ABSTRACT

The disclosed computer-implemented method for location-aware access to cloud data stores may include (1) obtaining a location policy that governs access to a cloud data store, the location policy specifying one or more location rules to be satisfied in order to access files in the cloud data store, (2) receiving a request, from a client system, to access one or more files in the cloud data store, (3) verifying that the request satisfies the location rule and therefore complies with the location policy, and (4) providing the client system access to the file in the cloud data store. Various other methods, systems, and computer-readable media are also disclosed.

20 Claims, 8 Drawing Sheets

(56) References Cited

OTHER PUBLICATIONS

Bertino et al, Location Based Access Control Systems for Mobile Users, 2011.*
Ardagna et al, Supporting Location-Based Conditions in Access Control Policies, 2006, 11 pages.*
Saravanakumar et al., Location Awareness of the Cloud Storage with Trust Management using Common Deployment Model, IEEE, 5 pages (Year: 2014).*
John, Sian, "Unified Security—A Vision of the Future", http://www.symantec.com/connect/blogs/unified-security-vision-future, as accessed Jan. 20, 2015, Symantec Official Blog, Symantec Corporation, (Dec. 22, 2014).
Zaramdioon, Saman et al., "K2C: Cryptographic Cloud Storage With Lazy Revocation and Anonymous Access", http://pages.cs.wisc.edu/~vg/papers/securecomm2011/securecomm2011.pdf, as accessed Jan. 20, 2015, (2011).

* cited by examiner

SYSTEMS AND METHODS FOR LOCATION-AWARE ACCESS TO CLOUD DATA STORES

BACKGROUND

A significant trend in recent years has been the movement of data and services to cloud-based systems. Increasingly, individuals and organizations rely on cloud-based data storage, even for sensitive data. Cloud-based data storage may provide a number of advantages, such as improved access to data. Cloud data stores may be accessible from nearly any location and using a variety of computing devices. Many cloud services provide data sharing features that may facilitate collaboration and communication.

Unfortunately, users of cloud data storage services may also relinquish some control over their data. Users may not be aware of the physical location of cloud services' data storage facilities. Cloud services may move data between locations without notifying users. As data moves from one location to another, the data may fall under various legal jurisdictions, each with their own laws governing when data must be disclosed to government entities.

Cloud storage users may place considerable trust in the cloud service provider that security policies are adequate and observed. Additionally, the accessibility of cloud data storage may also imply that hackers located anywhere can attempt to gain access to the data. Contractual or legal requirements governing data accessibility may even preclude the use of cloud storage entirely. Accordingly, the instant disclosure identifies and addresses a need for additional and improved systems for location-aware access to cloud data stores.

SUMMARY

As will be described in greater detail below, the instant disclosure describes various systems and methods for location-aware access to cloud data stores by providing access to files in a cloud data store only if the access meets the criteria of a location policy. A location policy may specify where the data is physically located and/or where the client accessing the data is located before access to the data is granted.

In one example, a computer-implemented method for location-aware access to cloud data stores may include (1) obtaining a location policy that governs access to a cloud data store, with the location policy specifying one or more location rules to be satisfied in order to access files in the cloud data store, (2) receiving a request, from a client system, to access one or more files in the cloud data store, (3) verifying that the request satisfies the location rule and therefore complies with the location policy, and (4) providing the client system access to the file in the cloud data store.

In one embodiment, the location rule may include a location criterion that identifies a permitted data store location for the cloud data store and/or a location criterion that identifies a permitted request location from which requests to access the cloud data store are permitted. In one embodiment, the location rule identifies the permitted data store location and/or the permitted request location with (1) an internet protocol address, (2) location information in a secure socket layer certificate, (3) a hardware attestation signature, (4) a media access control address, (5) an autonomous system number, and/or (6) border gateway protocol information.

In some examples, the computer-implemented method may further include initiating encryption of files in the cloud data store by (1) receiving, from a user, credentials to authenticate as the user to the cloud data store, (2) in response to receiving the credentials, authenticating as the user to the cloud data store, (3) generating at least one cryptographic element for encrypting and decrypting the user's files in the cloud data store, and (4) encrypting the file in the cloud data store using the cryptographic element. In some examples, providing the client system access to the file in the cloud data store may include (1) using the credentials received from the user to authenticate as the user to the cloud data store, (2) retrieving the file from the cloud data store, (3) decrypting the file using the cryptographic element, and (4) providing the decrypted file to the client system.

In some examples, providing the client system access to the file in the cloud data store may include providing, to the client system, the cryptographic element for decrypting the file. In some examples, the computer-implemented method may further include revoking access previously provided to the file in the cloud data store by (1) using the credentials received from the user to authenticate as the user to the cloud data store, (2) generating one or more new cryptographic elements for encrypting and decrypting files in the cloud data store, (3) decrypting the file in the cloud data store using the cryptographic element, and (4) re-encrypting the file in the cloud data store using the new cryptographic element.

In some examples, receiving the request from the client to access the file in the cloud data store may include receiving a client encryption key, and providing the client system access to the file in the cloud data store may include (1) retrieving the file from the cloud data store, (2) decrypting the file using the cryptographic element, (3) re-encrypting the file using the client encryption key, and (4) providing the re-encrypted file to the client system. In one embodiment, the cryptographic element may include a public encryption key and a private decryption key, and encrypting the file in the cloud data store using the cryptographic element may include providing the public encryption key to a cryptographic client to encrypt the file in the cloud data store. In one embodiment, the cryptographic client may include the client system and/or the cloud data store.

In one embodiment, a system for implementing the above-described method may include several modules stored in memory, such as (1) a policy module that obtains a location policy that governs access to a cloud data store, with the location policy specifying one or more location rules to be satisfied in order to access files in the cloud data store, (2) a communication module that receives a request, from a client system, to access one or more files in the cloud data store, (3) a verification module that verifies that the request satisfies the location rule and therefore complies with the location policy, and/or (4) an access module that provides the client system access to the file in the cloud data store. The system may also include at least one physical processor configured to execute the policy module, the communication module, the verification module, and the access module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) obtain a location policy that governs access to a cloud data store, with the location policy specifying one or more location rules to be satisfied in order to access files in the cloud data store, (2) receive a request, from a client system, to access one or more files in the cloud data store, (3) verify that the request satisfies the location rule and therefore complies with the location policy, and (4) provide the client system access to the file in the cloud data store.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
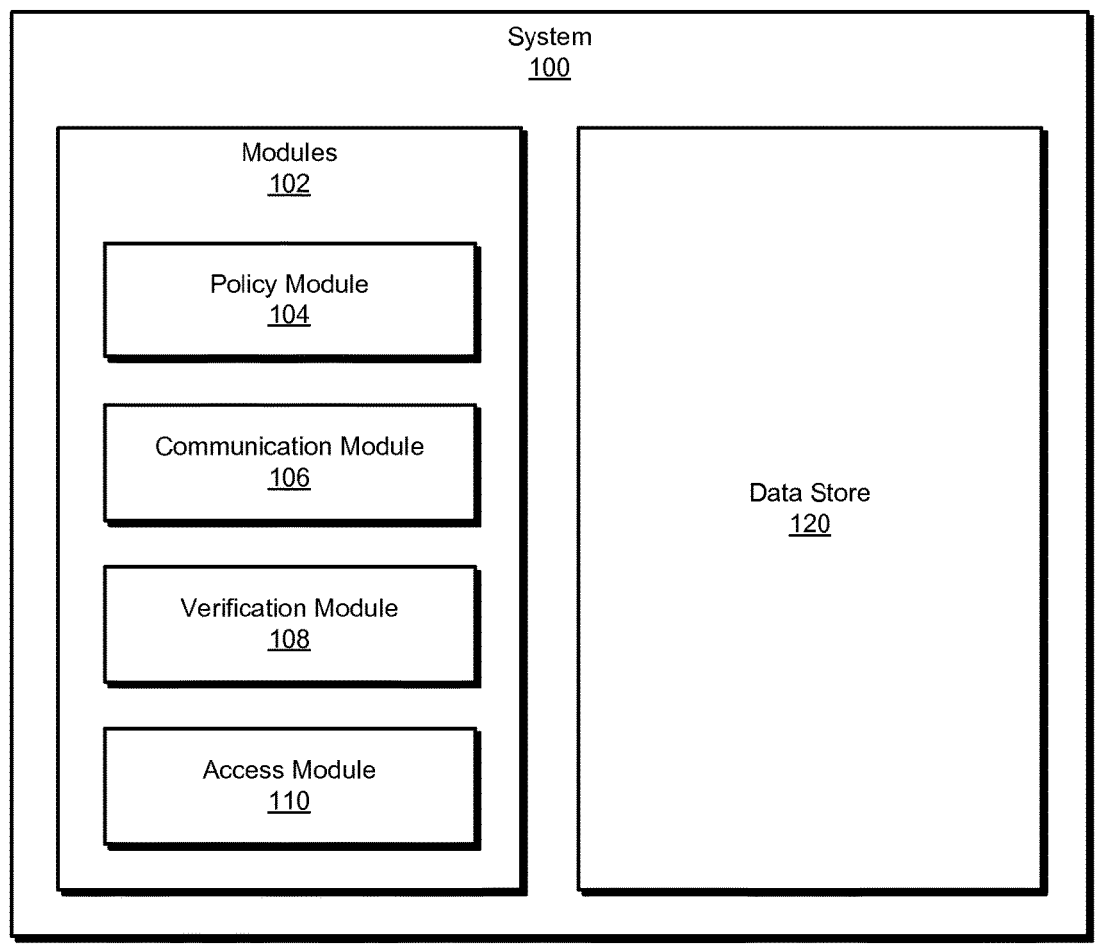
FIG. 1 is a block diagram of an exemplary system for location-aware access to cloud data stores.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for location-aware access to cloud data stores. As will be explained in greater detail below, the systems and methods described herein may control access to files in a cloud data store according to a location policy that may specify permitted locations for the cloud data store and/or client systems requesting access to the cloud data store. Location criteria specified in the location policy must be met before the systems and methods described herein permit access to the cloud data files. In some examples, the systems and methods described herein may administer location-based access to cloud data files by encrypting the data files using cryptographic keys that are not stored with files in the cloud service, which may thereby reduce the degree of trust cloud service users place in cloud service providers. In some examples, the systems and methods described herein may encrypt data using a client encryption key before transmitting the data to a client system, thereby providing additional protection to the data in transit.

The following will provide, with reference to FIGS. 1, 2, and 4-6, detailed descriptions of exemplary systems for location-aware access to cloud data stores. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for location-aware access to cloud data stores. As illustrated in this figure, exemplary system 100 may include one or more modules 102 for performing one or more tasks. For example, and as will be explained in greater detail below, exemplary system 100 may include a policy module 104 that may obtain a location policy that governs access to a cloud data store, the location policy specifying one or more location rules to be satisfied in order to access files in the cloud data store. Exemplary system 100 may additionally include a communication module 106 that may receive a request, from a client system, to access one or more files in the cloud data store. Exemplary system 100 may also include a verification module 108 that may verify that the request satisfies the location rule and therefore complies with the location policy. Exemplary system 100 may additionally include an access module 110 that may provide the client system access to the file in the cloud data store. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., location service 202 and/or cloud server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as data store 120. In one example, data store 120 may be configured to store personal and/or confidential data belonging to a user or organization. Data store 120 may represent portions of a single database or computing device or a plurality of databases or computing devices. For example, data store 120 may represent a portion of cloud server 206 in FIG. 2, computing system 710 in FIG. 7, and/or portions of exemplary network architecture 800 in FIG. 8. Alternatively, data store 120 in FIG. 1 may represent one or more physically separate devices capable of being accessed by a computing device, such as cloud server 206 in FIG. 2, computing system 710 in FIG. 7, and/or portions of exemplary network architecture 800 in FIG. 8.

Figure 2:
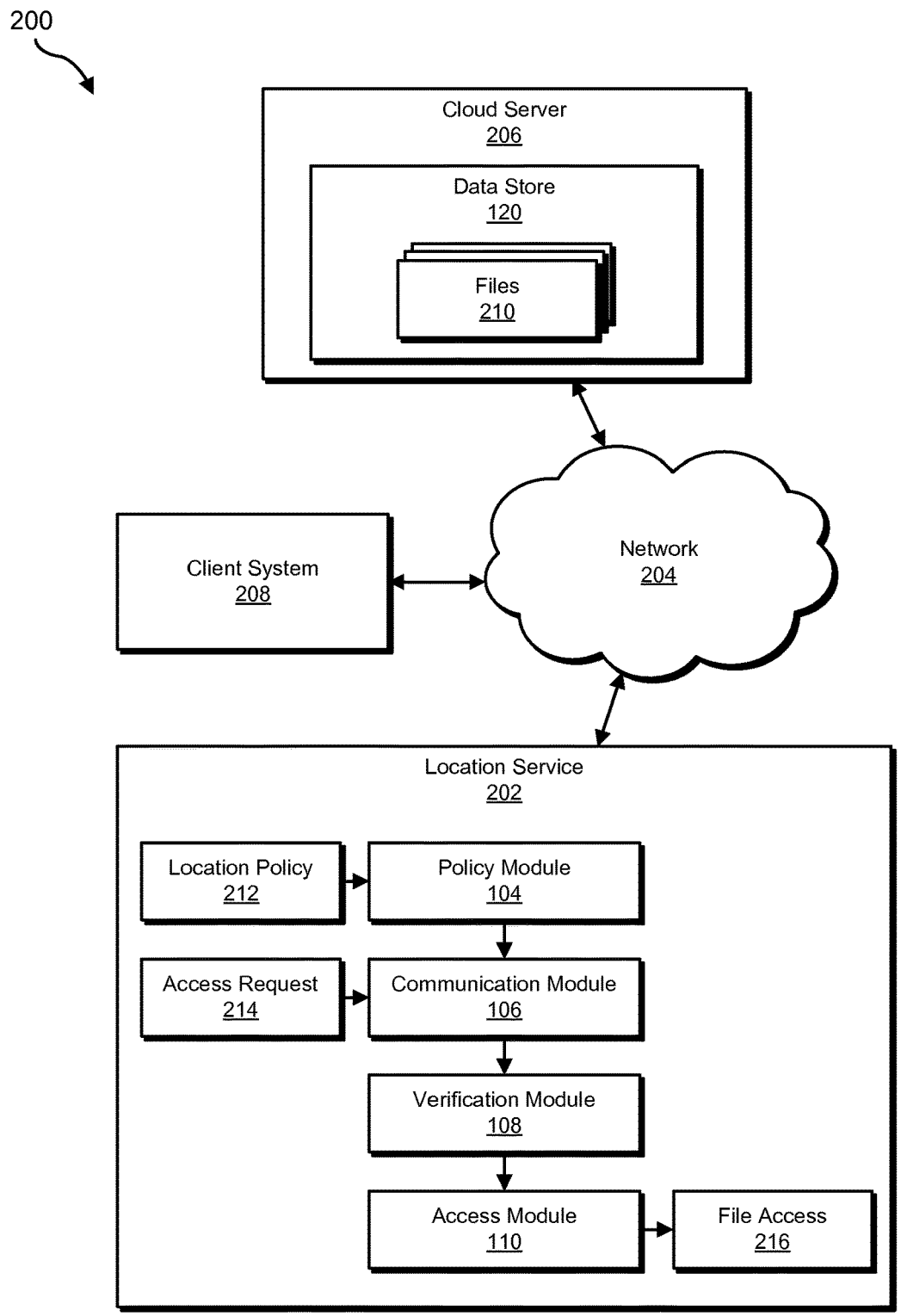
FIG. 2 is a block diagram of an additional exemplary system for location-aware access to cloud data stores.

Exemplary system 100 in FIG. 1 may be implemented in a variety of ways. For example, all or a portion of exemplary system 100 may represent portions of exemplary system 200 in FIG. 2. As shown in FIG. 2, system 200 may include a location service 202 in communication with a cloud server 206 via a network 204. In one example, location service 202 may be programmed with one or more of modules 102 and/or may store all or a portion of the data in data store 120. Additionally or alternatively, cloud server 206 may be programmed with one or more of modules 102 and/or may store all or a portion of the data in data store 120.

In one embodiment, one or more of modules 102 from FIG. 1 may, when executed by at least one processor of location service 202 and/or cloud server 206, enable location service 202 and/or cloud server 206 to provide location-aware access to cloud data stores. For example, and as will be described in greater detail below, policy module 104 may obtain a location policy 212 that governs access to a cloud data store 120, with location policy 212 specifying one or more location rules to be satisfied in order to access files 210 in cloud data store 120. Communication module 106 may receive an access request 214, from a client system 208, to access one or more files 210 in the cloud data store. Verification module 108 may verify that access request 214 satisfies the location rule and therefore complies with location policy 212. Access module 110 may provide client system 208 access to files 210 in cloud data store 120.

Client system 208 generally represents any type or form of computing device capable of reading computer-executable instructions. Examples of client system 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Location service 202 and/or cloud server 206 generally represent any type or form of computing device that is capable of storing, comparing, and providing data, and reading computer-executable instructions. Examples of location service 202 and cloud server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between location service 202, cloud server 206, and client system 208.

Figure 3:
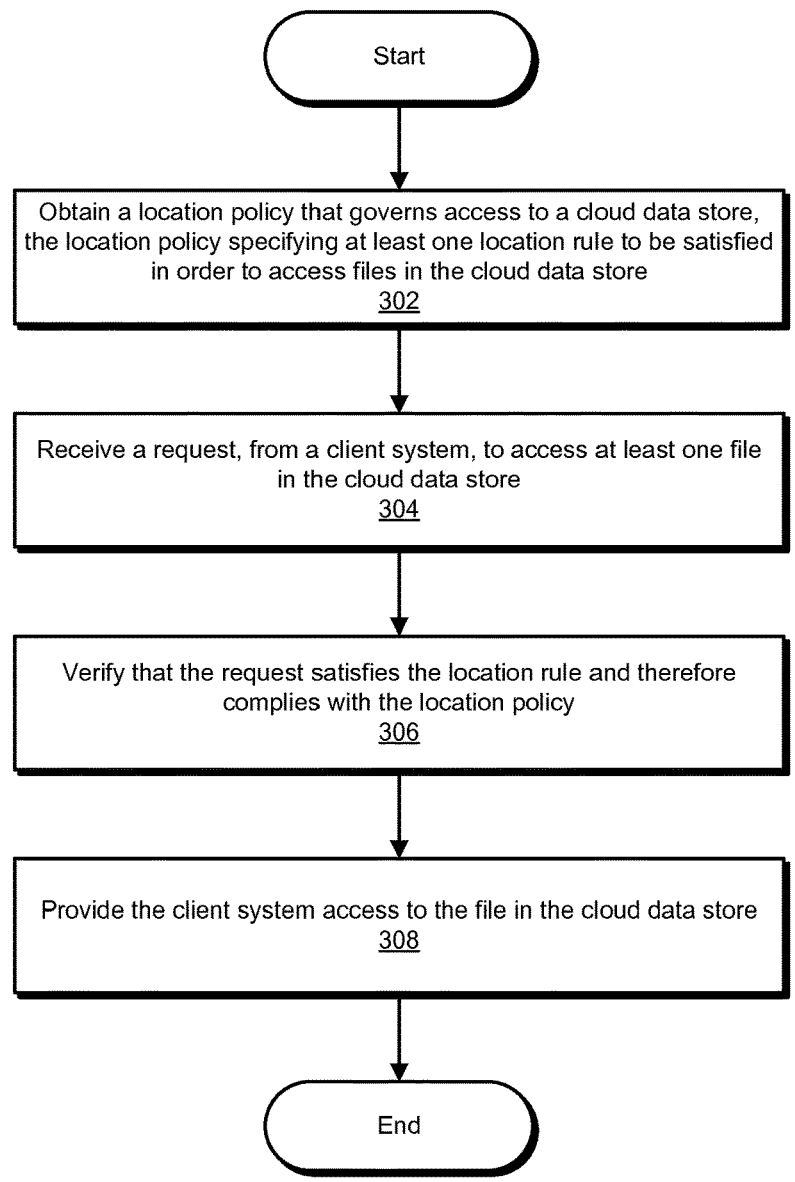
FIG. 3 is a flow diagram of an exemplary method for location-aware access to cloud data stores.

FIG. 3 is a flow diagram of an exemplary computer-implemented method 300 for location-aware access to cloud data stores. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302, one or more of the systems described herein may obtain a location policy that governs access to a cloud data store, with the location policy specifying one or more location rules to be satisfied in order to access files in the cloud data store. For example, policy module 104 may, as part of location service 202 in FIG. 2, obtain location policy 212 that governs access to cloud data store 120, with location policy 212 specifying one or more location rules to be satisfied in order to access files 210 in cloud data store 120.

Policy module 104 may obtain a location policy in a variety of ways and in a variety of contexts. For example, policy module 104 may operate as part of a location service provided by a computing security service provider. In another example, the location service may be provided by an organization (such as a corporation or Internet service provider) on behalf of the organization's members or clients. Policy module 104 may receive location policies by providing individual users or organizational clients of the location service an electronic form for identifying cloud services hosting data storage for the client and specifying location rules to be met before the location service grants access to the cloud data store.

In one embodiment, the location rule may include a location criterion that identifies a permitted data store location for the cloud data store and/or a location criterion that identifies a permitted request location from which requests to access the cloud data store are permitted. For example, a user may specify that the location service is only to grant access to the user's cloud data store if the data store and the client attempting to access it are both physically located in the United States. In another example, an organization may specify that user accounts governed by the organization's location policy may be accessed by computing devices located anywhere, but the location service is only to grant access to data in the users' cloud storage accounts if the cloud data stores are located in Canada.

In one embodiment, the location rule may specify different location criteria, depending on the type of access requested. For example, a location rule may specify that the location service is to grant access to read data from the cloud data store from any location, but the location service is only grant access to add or modify files in the cloud data store if the access requests originate from North America. In another embodiment, the location rule may specify different location criteria, depending on the type of device making the access request. For example, a corporation may have a location rule specifying that the location service is to grant access to the cloud data store to mobile devices from any location, but only to other computing devices located at one of the corporation's offices.

At step 304, one or more of the systems described herein may receive a request, from a client system, to access one or more files in the cloud data store. For example, communication module 106 may, as part of location service 202 in FIG. 2, receive an access request 214, from client system 208, to access one or more files 210 in cloud data store 120.

Communication module 106 may receive a request to access files in the cloud data store in a variety of ways. For example, communication module 106 may provide a proxy service with an interface that uses standard protocols, such as File Transfer Protocol (FTP) or Hypertext Transfer Protocol (HTTP) that permits clients to request access to files in the cloud data store. The location service may then determine whether to provide access to the cloud data, if the request meets rules specified in the location policy.

As will be described in greater detail below, in some examples, the client submitting the request to access files in the cloud data store may transmit a client encryption key to communication module 106.

At step 306, one or more of the systems described herein may verify that the request satisfies the location rule and therefore complies with the location policy. For example, verification module 108 may, as part of location service 202 in FIG. 2, verify that access request 214 satisfies location rules included in location policy 212 and therefore complies with location policy 212.

Verification module 108 may verify that the request to access files in the cloud data store satisfies location rules in a variety of ways. For example, verification module 108 may determine the location of the client requesting access to the cloud data store by inspecting one or more location identifiers for the client system. Additionally or alternatively, verification module 108 may determine the location of the cloud data store by inspecting one or more location identifiers for the cloud service.

The term "location identifiers," as used herein, generally refers to attributes of computing devices and/or the networks to which they are connected that indicate the location of the client system and/or cloud service. Location identifiers may include, without limitation, Internet Protocol (IP) addresses, location information in a Secure Socket Layer (SSL) certificate, hardware attestation signatures, Media Access Control (MAC) addresses, Autonomous System Numbers (ASNs), and/or Border Gateway Protocol (BGP) information, and/or any other suitable indicator of the physical location of the client system and/or cloud service.

Location identifiers may vary in accuracy and reliability. For example, geolocation by IP address may identify the country where a client or server is located with a high degree of certainty, but the accuracy may not extend to the city level. Likewise, ASNs and BGP information may be reliable to a regional level, but not to specific location. Location information in a server's SSL certificate may only be as reliable as the organization that operates the server. The MAC address of wireless access points may reliably identify the location of devices connecting to the access point, but many access points are not included in MAC address location databases. Hardware attestation may reliably and accurately locate a computing device, but is not yet available for many devices.

In some examples, location rules administered by verification module 108 may require a client and/or cloud data service to provide access to specific location identifiers before granting access to files in the cloud data store. For example, verification module 108 may communicate with a client agent in a mobile device to obtain Global Positioning System (GPS) coordinates or cellular connection data that identify the location of a client device. In some examples, verification module 108 may require access to certain combinations of location identifiers. For example, geolocation using an ASN may be considered more reliable than when using an IP address, so a location rule may specify that the location of a client system must be identified using either an ASN or a combination of IP and MAC addresses before granting access to cloud data files.

In some examples, verification module 108 may consider factors other than the location of the client or cloud service when determining whether to grant access to the cloud data store. For example, verification module 108 may consider whether the client is making a request to read, create, or modify files in the cloud data store, and if the location policy specifies whether different access request types are to be handled differently. Verification module 108 may also consider the type of client making the access request (e.g., whether the request comes from a mobile or non-mobile device), and whether the location policy specifies different permitted locations for different types of devices.

At step 308, one or more of the systems described herein may provide the client system access to the file in the cloud data store. For example, access module 110 may, as part of location service 202 in FIG. 2, provide client system 208 access to files 210 in cloud data store 120.

Access module 110 may provide the client system access to files in the cloud data store in a variety of ways. For example, and as will be described in greater detail below, access module 110 may provide access to files in the cloud data store by decrypting the files and providing the decrypted files to the requesting client. In other examples, access module 110 may use any suitable method for providing access to files in the cloud data store. In some examples, access module 110 may encrypt the files using a client encryption key before transmitting the files to the requesting client system.

In some examples, systems described herein may include initiating encryption of files in the cloud data store by (1) receiving, from a user, credentials to authenticate as the user to the cloud data store, (2) in response to receiving the credentials, authenticating as the user to the cloud data store, (3) generating one or more cryptographic elements for encrypting and decrypting the user's files in the cloud data store, and (4) encrypting the files in the cloud data store using the cryptographic element. The process of initiating encryption of files in the cloud data store will be explained in greater detail in the description of FIG. 4 below.

The term "cryptographic element," as used herein, generally refers to any value or object capable of being protected or secured from unauthorized access via one or more cryptographic functions. For example, the phrase "cryptographic element" may refer to a cryptographic key used for encryption and/or authentication. In some examples, a cryptographic element may be part of an asymmetric key pair that includes both an encryption key (or "public key") and a decryption key (or "private key"). The encryption key may include any key that does not require secrecy in order to secure data encrypted with the key. For example, the encryption key may be used to encrypt data using an asymmetric key algorithm. Consequently, decrypting data encrypted with the encryption key may require the corresponding decryption key of the asymmetric key pair. In other examples, the same cryptographic element may be used for both encryption and decryption.

Figure 4:
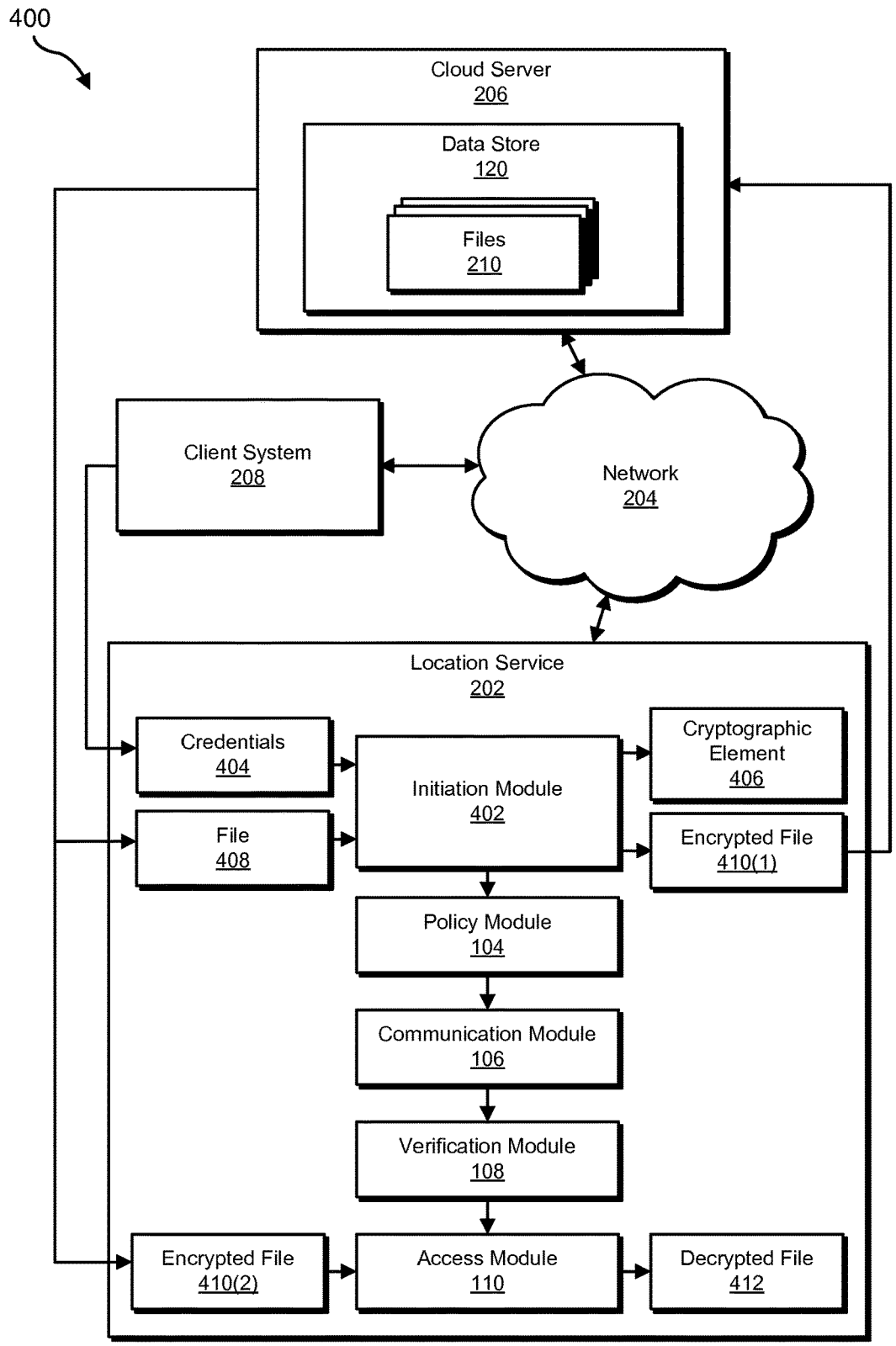
FIG. 4 is a block diagram of an exemplary system for initiating location-aware access to cloud data stores.

FIG. 4 is a block diagram of an exemplary system 400 for initiating location-aware access to cloud data stores. Exemplary system 400 may include components of system 200 in FIG. 2, such as location service 202, network 204, cloud server 206, and client system 208. Additionally, exemplary system 400 may include initiation module 402. Initiation module 402, as part of system 400 may receive credentials 404 from client system 208 to authenticate as the user of client system 208 to cloud server 206 to access cloud data store 120. In response to receiving the credentials, initiation module 402 may authenticate as the user to cloud server 206. Initiation module 402 may generate cryptographic element 406 to encrypt and decrypt files 210 in cloud data store 120. Using cryptographic element 406, initiation module 402 may encrypt one or more files 210, such as file 408 to produce encrypted file 410(1), which is then stored in data store 120.

In some examples, the cloud service may initially encrypt files in the cloud data store using a public encryption key provided by the location service. Additionally, either the client system or the cloud service may encrypt files as they are added to the cloud data store using a public encryption key from the location service. The location service may retain the private decryption key from the asymmetric key pair corresponding to the public encryption key provided, to be used to decrypt files requested by the client system at a later time.

To provide access to encrypted files in the cloud data store, location service 202 may, in response to receiving a request to access the files, retrieve the encrypted files from the cloud data store and decrypt the files. In some examples, access module 110 may provide the client system access to the file in the cloud data store by (1) using the credentials received from the user to authenticate as the user to the cloud data store, (2) retrieving the file from the cloud data store, (3) decrypting the file using the cryptographic element, and (4) providing the decrypted file to the client system. For example, as part of exemplary system 400 in FIG. 4, access module 110 may use credentials 404 received from client system 208 to authenticate as the user of client system 208 to access cloud data store 120. Access module 110 may then retrieve encrypted file 410(2) from data store 120, and decrypt the file using cryptographic element 406 to produce decrypted file 412. Access module 110 may then provide decrypted file 412 to client system 208.

In some examples, access module 110 may provide the client system access to the file in the cloud data store by providing the cryptographic element for decrypting the file to the client system, rather than providing the decrypted file. For example, as part of location service 202 in FIG. 4, access module 110 may provide cryptographic element 406 to client system 208. Client system 208 may then retrieve encrypted file 410(2) from data store 120 and decrypt the file using cryptographic element 406. This approach may be advantageous when the client system does not require frequent access to files in the cloud data store, but at times when access to the cloud data store is required, the client needs to access many files.

Providing the cryptographic element to the client system makes it possible for the client system to download and decrypt files directly, rather than receiving them via the location service, which may reduce the amount of time required to access many files. A possible disadvantage to this approach may be that once access module 110 has provided the cryptographic element to the client system, the client system may access to files in the cloud data store even if a change in location of either the client system or the cloud data store result in a violation of the location policy. To maintain the location policy, access module 110 may need to revoke the access granted to the client system to the cloud data store. Access module 110 may use any suitable method for revoking access previously granted to the cloud data store. In one example (described in greater detail below), access module 110 may revoke access to the cloud data store by re-encrypting files in the cloud data store using a new cryptographic element. In other examples, access module 110 may employ advanced encryption schemes that are location-aware or do not require decryption and re-encryption.

In some examples, systems described herein may include revoking access previously provided to files in the cloud data store by (1) using the credentials received from the user to authenticate as the user to the cloud data store, (2) generating at least one new cryptographic element for encrypting and decrypting files in the cloud data store, (3) decrypting the files in the cloud data store using the cryptographic element, and (4) re-encrypting the files in the cloud data store using the new cryptographic element. Rather than decrypting and re-encrypting files in the cloud data store themselves, access module 110 may decrypt and re-encrypt a master cryptographic element that is actually used to encrypt and decrypt files in the cloud data store.

Figure 5:
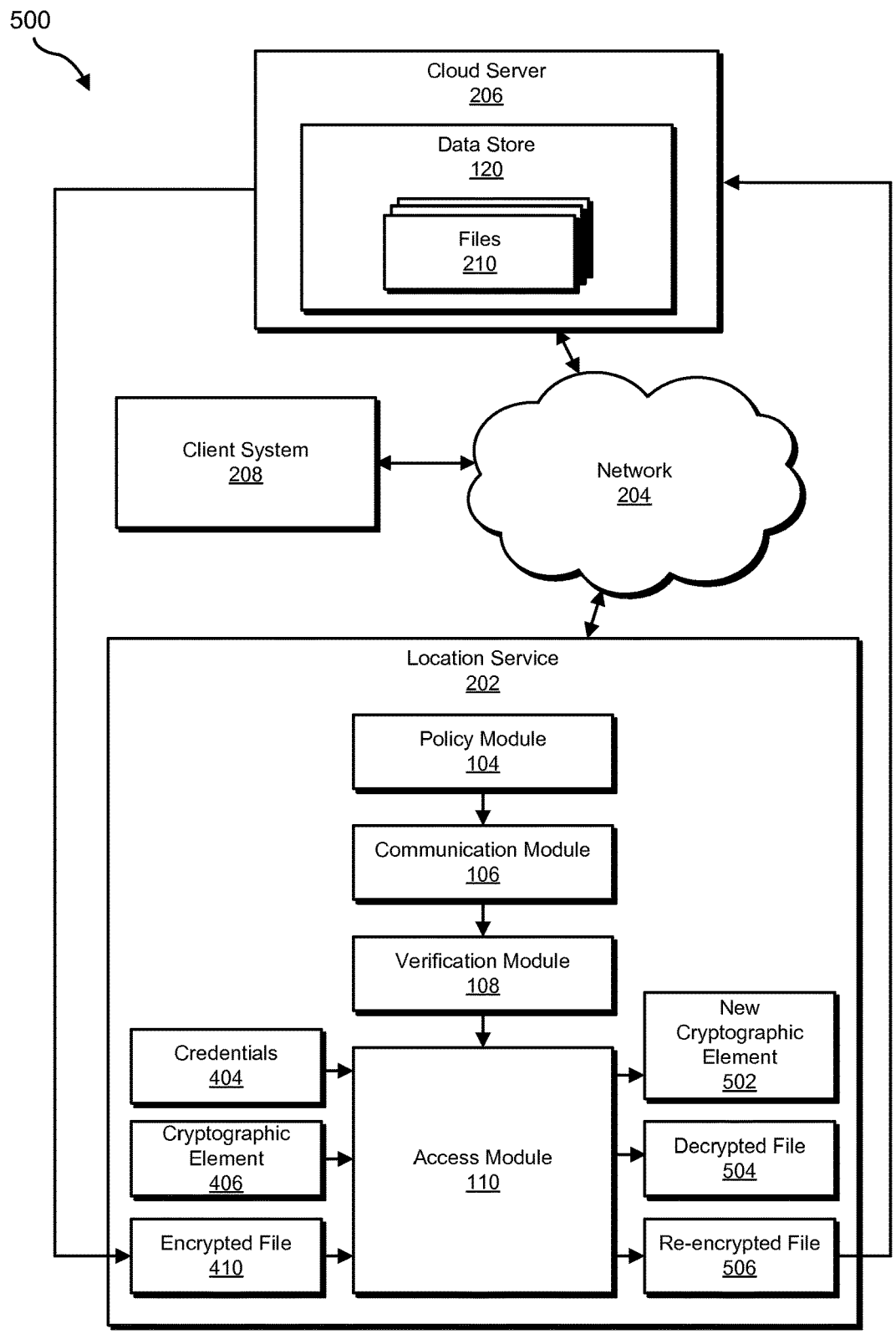
FIG. 5 is a block diagram of an exemplary system for revoking access to cloud data stores.

FIG. 5 is a block diagram of an exemplary system 500 for revoking access to cloud data stores. Exemplary system 500 may include components of exemplary system 200 in FIG. 2, such as location service 202, network 204, cloud server 206, and client system 208. As shown in FIG. 5, access module 110 may revoke access granted to client system 208 to cloud data store 120 by authenticating as the user to cloud data store 120. Access module 110 may generate new cryptographic element 502 for encrypting and decrypting files in cloud data store 120. Using cryptographic element 406, access module 110 may decrypt encrypted file 410 from cloud data store 120 to produce decrypted file 504. Access module 110 may then re-encrypt decrypted file 504 to produce re-encrypted file 506, which access module 110 may then store in data store 120. Cryptographic element 406, previously provided to client system 208, is no longer usable to decrypt files in cloud data store 120, and therefore access module 110 has revoked the access previously granted.

Location service 202 may also encrypt cloud data files requested by a client system before they are transmitted to the client. Encrypting the files before transmission may protect the requested files from being disclosed in transit to the client system. In some examples, communication module 106 may receive a request from the client to access files in the cloud data store that includes a client encryption key. Access module 110 may provide the client system access to the file in the cloud data store by (1) retrieving the file from the cloud data store, (2) decrypting the file using the cryptographic element, (3) re-encrypting the file using the client encryption key, and (4) providing the re-encrypted file to the client system.

Figure 6:
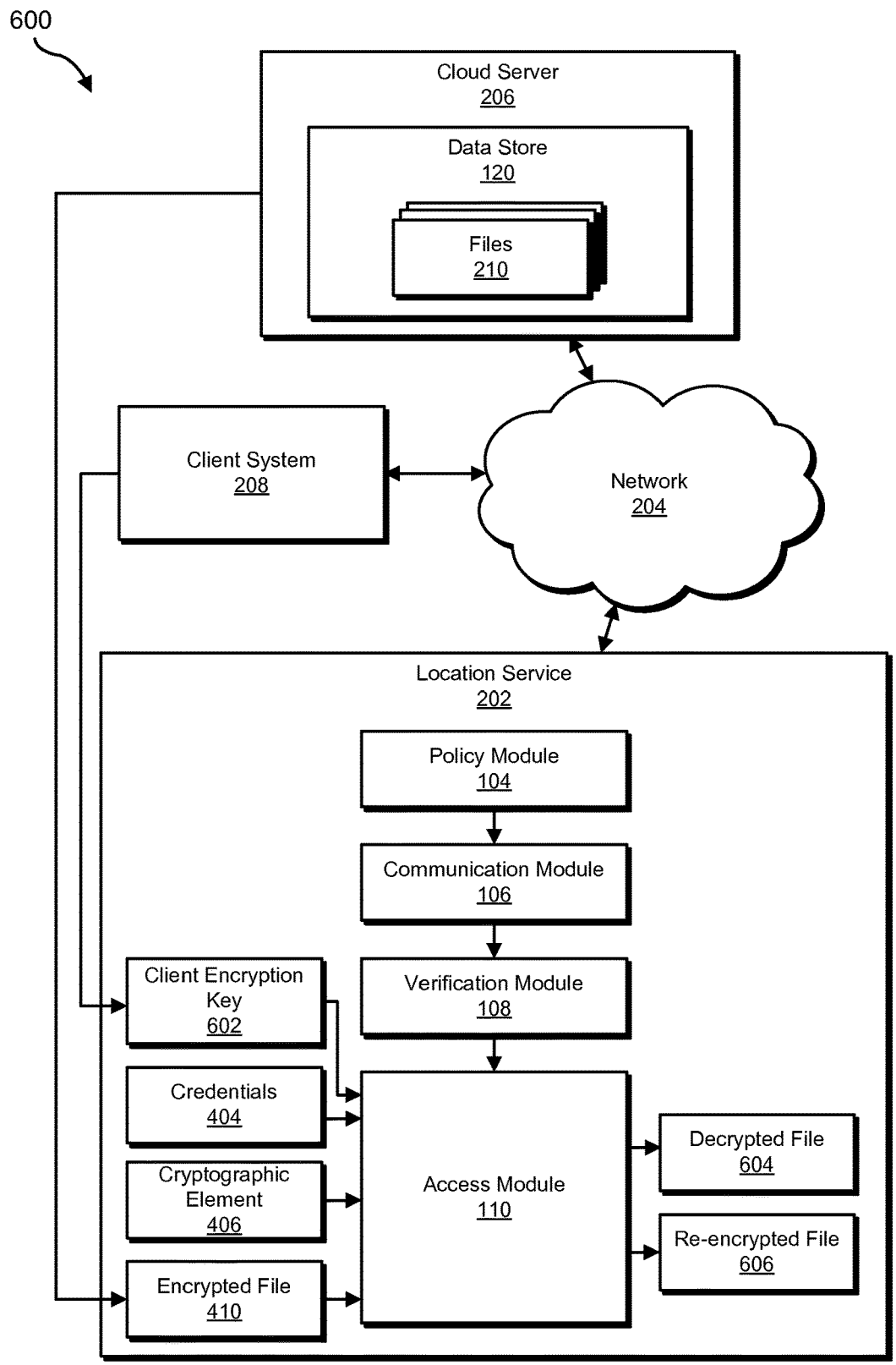
FIG. 6 is a block diagram of an exemplary system for providing location-aware access to cloud data stores using a client encryption key.

FIG. 6 is a block diagram of an exemplary system 600 for providing location-aware access to cloud data stores using a client encryption key. FIG. 6 may include components of exemplary system 200 in FIG. 2, such as location service 202, network 204, cloud server 206, and client system 208. To provide requested files to the client in encrypted form, access module 110 may receive client encryption key 602 from client system 208. Client encryption key 602 may be a public encryption key from an asymmetric key pair from which client system 208 retains the corresponding private decryption key. Access module 110 may use credentials 404 received from client system 208 to authenticate as the user to cloud server 206 to access the user's cloud data store 120. Access module 110 may retrieve the requested encrypted file 410 from data store 120 and, using cryptographic element 406, decrypt encrypted file 410 to produce decrypted file 604. Access module 110 may then use client encryption key 602 to re-encrypt decrypted file 604 to produce re-encrypted file 606, which may then be transmitted to client system 208.

As described above, the systems and methods described herein may control access to files in a could data store according to a location policy, which may include rules that specify permitted locations for the cloud data store and/or permitted locations for clients requesting access to the cloud data store. Systems and methods described herein may provide access to the cloud data store only when the rules included in the location policy are met. Systems and methods described herein may enforce location policies by encrypting files in the cloud data store, and decrypting files requested by client systems only when rules included in the location policy are met. Systems and methods described herein may encrypt files in the cloud data store using cryptographic elements that are not stored with the cloud data store, thereby providing a degree of protection against hackers by separating the encrypted files from the cryptographic elements needed to decrypt them. Systems and methods described herein may also protect files from being disclosed during transmission to a client system by encrypting the files using a public encryption key received from the client system before the files are transmitted.

Figure 7:
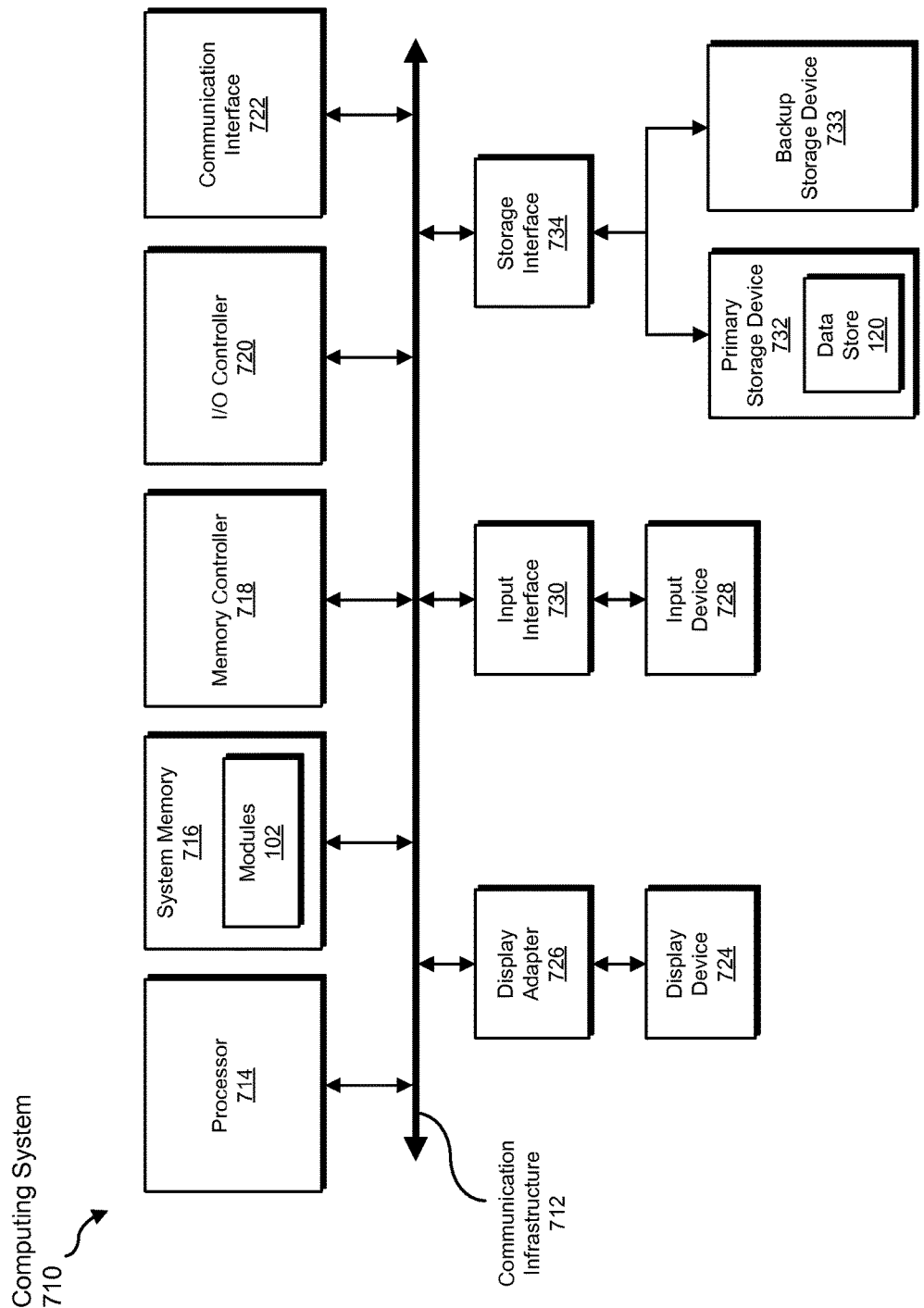
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, data store 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
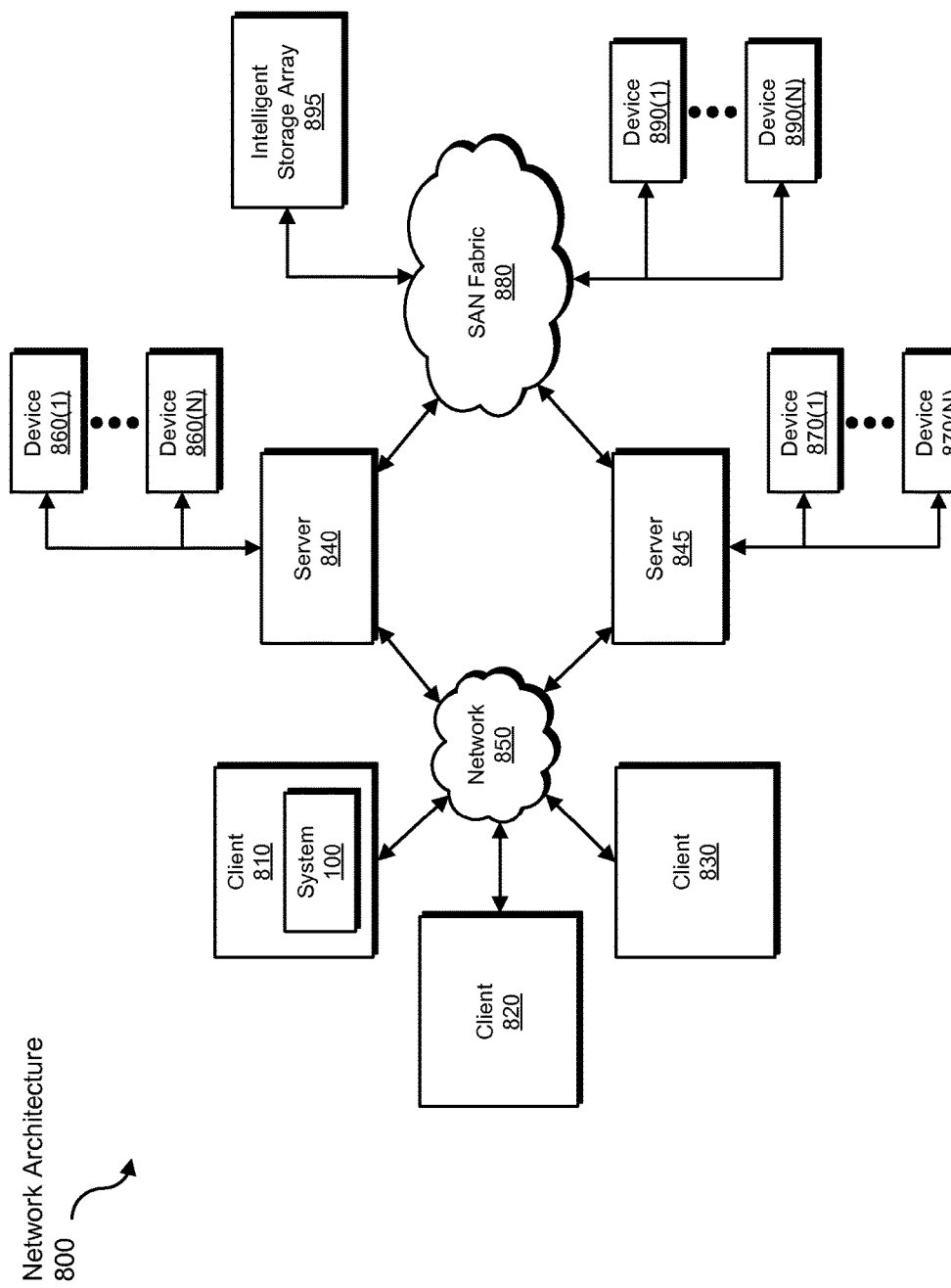
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for location-aware access to cloud data stores.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a data access request to be transformed, transform the request, output a result of the transformation to verify that the request satisfies rules of a location policy, use the result of the transformation to determine that the request complies with the location policy, and store the result of the transformation to provide access to the data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for location-aware access to cloud data stores, at least a portion of the method being performed by a computing device comprising at least one processor, the method comprising:

obtaining a location policy that governs access to a cloud data store, the location policy specifying a location rule to be satisfied in order to access files in the cloud data store, the location rule including a location criterion that identifies a permitted data store location for the cloud data store as being distinct from a permitted request location from which requests to access the cloud data store are permitted;

receiving a request, from a client system, to access at least one file in the cloud data store;

verifying that the request satisfies the location rule and therefore complies with the location policy by verifying that the cloud data store is located within the permitted data store location;

providing to the client system, by a location service that is distinct from the cloud data store, and in response to verifying that the cloud data store is located within the permitted data store location, access to the file in the cloud data store by providing to the client system a cryptographic element;

after providing the cryptographic element to the client system by the location service, retrieving, by the client system, the file from the cloud data store; and decrypting, by the client system, the file using the cryptographic element, wherein providing the cryptographic element to the client system enables the client system to download and decrypt the file directly from the cloud data store rather than receiving the file via the location service.

2. The computer-implemented method of claim 1, further comprising initiating encryption of the file in the cloud data store by receiving, from a user, credentials to authenticate as the user to the cloud data store.

3. The computer-implemented method of claim 2, wherein initiating encryption of the file in the cloud data store further comprises, in response to receiving the credentials, authenticating as the user to the cloud data store.

4. The computer-implemented method of claim 3, wherein initiating encryption of the file in the cloud data store further comprises:

generating the cryptographic element for encrypting and decrypting the file in the cloud data store; and encrypting the file in the cloud data store using the cryptographic element.

5. The computer-implemented method of claim 1, wherein the location service is provided by a computing security service provider.

6. The computer-implemented method of claim 1, wherein:

the location rule includes both:
  the location criterion that identifies the permitted data store location for the cloud data store; and
  an additional location criterion that identifies the permitted request location from which requests to access the cloud data store are permitted; and verifying that the request satisfies the location rule comprises verifying that the location criterion and the additional location criterion are both satisfied.

7. The computer-implemented method of claim 4, further comprising revoking access previously provided to the file in the cloud data store by:

using the credentials received from the user to authenticate as the user to the cloud data store;

generating at least one new cryptographic element for encrypting and decrypting the file in the cloud data store;

decrypting the file in the cloud data store using the cryptographic element; and re-encrypting the file in the cloud data store using the new cryptographic element.

8. The computer-implemented method of claim 1, wherein the location rule identifies the permitted data store location with an internet protocol address.

9. The computer-implemented method of claim 4:
wherein the cryptographic element is part of an asymmetric key pair that includes both:
a public encryption key; and
a private decryption key; and
wherein encrypting the file in the cloud data store using the cryptographic element comprises providing the public encryption key to a cryptographic client to encrypt the file in the cloud data store.

10. The computer-implemented method of claim 9, wherein the cryptographic client comprises at least one of:
the client system; and
the cloud data store.

11. The computer-implemented method of claim 1, wherein the permitted data store location for the cloud data store comprises a permitted geographic location region for the cloud data store.

12. The computer-implemented method of claim 1, wherein the location rule requires identification of the permitted data store location using either a geolocation identifier or a combination of two or more of the following:
an internet protocol address;
location information in a secure socket layer certificate;
a hardware attestation signature;
a media access control address;
an autonomous system number; and
border gateway protocol information.

13. A system for location-aware access to cloud data stores, the system comprising:
a policy module, stored in memory, that obtains, as part of a location service, a location policy that governs access to a cloud data store, the location policy specifying a location rule to be satisfied in order to access files in the cloud data store, the location rule including a location criterion that identifies a permitted data store location for the cloud data store as being distinct from a permitted request location from which requests to access the cloud data store are permitted;
a communication module, stored in memory, that receives, as part of the location service, a request, from a client system, to access at least one file in the cloud data store, the location service and the cloud data store being distinct;
a verification module, stored in memory, that verifies, as part of the location service, that the request satisfies the location rule and therefore complies with the location policy by verifying that the cloud data store is located within the permitted data store location;
an access module, stored in memory, that provides to the client system, as part of the location service, and in response to verifying that the cloud data store is located within the permitted data store location, access to the file in the cloud data store by providing to the client system a cryptographic element;
the client system that:
after receiving the cryptographic element from the location service, retrieves the file from the cloud data store; and
decrypts the file using the cryptographic element, wherein providing the cryptographic element to the client system enables the client system to download and decrypt the file directly from the cloud data store rather than receiving the file via the location service; and
at least one physical processor configured to execute the policy module, the communication module, the verification module, and the access module.

14. The system of claim 13, further comprising an initiation module, stored in memory, that initiates encryption of the file in the cloud data store by receiving, from a user, credentials to authenticate as the user to the cloud data store.

15. The system of claim 14, wherein the initiation module further initiates encryption of the file in the cloud data store by authenticating, in response to receiving the credentials, as the user to the cloud data store.

16. The system of claim 15, wherein the initiation module further initiates encryption of the file in the cloud data store by:
generating the cryptographic element for encrypting and decrypting the file in the cloud data store; and
encrypting the file in the cloud data store using the cryptographic element.

17. The system of claim 11, wherein the location service is provided by a computing security service provider.

18. The system of claim 13, wherein:
the location rule includes both:
the location criterion that identifies the permitted data store location for the cloud data store; and
an additional location criterion that identifies the permitted request location from which requests to access the cloud data store are permitted; and
verifying that the request satisfies the location rule comprises verifying that the location criterion and the additional location criterion are both satisfied.

19. The system of claim 13, wherein the location rule identifies the permitted data store location with an internet protocol address.

20. A non-transitory computer-readable medium comprising one or more computer-readable instructions that, when executed by at least one processor of a computing device, cause the computing device to:
obtain a location policy that governs access to a cloud data store, the location policy specifying a location rule to be satisfied in order to access files in the cloud data store, the location rule including a location criterion that identifies a permitted data store location for the cloud data store as being distinct from a permitted request location from which requests to access the cloud data store are permitted;
receive a request, from a client system, to access at least one file in the cloud data store;
verify that the request satisfies the location rule and therefore complies with the location policy by verifying that the cloud data store is located within the permitted data store location;
provide to the client system, by a location service that is distinct from the cloud data store, and in response to verifying that the cloud data store is located within the permitted data store location, access to the file in the cloud data store by providing to the client system a cryptographic element;
after providing the cryptographic element to the client system by the location service, retrieve, by the client system, the file from the cloud data store; and
decrypt, by the client system, the file using the cryptographic element, wherein providing the cryptographic element to the client system enables the client system to download and decrypt the file directly from the cloud data store rather than receiving the file via the location service.

* * * * *